No. 807,955. PATENTED DEC. 19, 1905.
J. H. MILLS & W. H. LAWSON.
CASKET.
APPLICATION FILED OCT. 11, 1905.
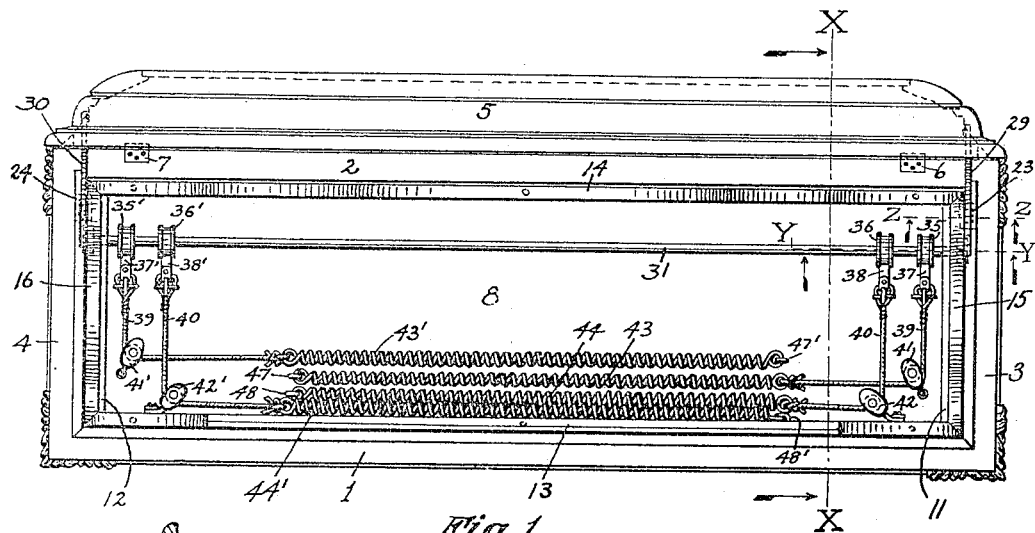
Fig. 1.
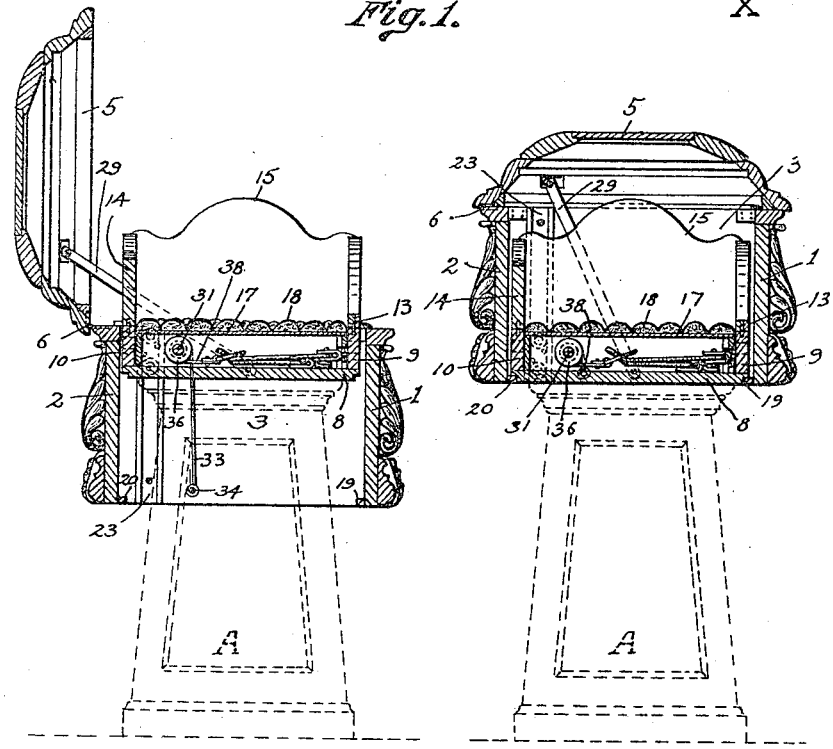
Fig. 2.   Fig. 3.
Fig. 4.
WITNESSES:
S. C. Duvall.
H. R. Marlatt.
J. H. MILLS
AND
W. H. LAWSON,
INVENTORS.
BY Robert W. Randle
ATTORNEY.

No. 807,955. PATENTED DEC. 19, 1905.
J. H. MILLS & W. H. LAWSON.
CASKET.
APPLICATION FILED OCT. 11, 1905.

2 SHEETS—SHEET 2.

WITNESSES:
S. C. Duvall.
H. R. Marlatt.

J. H. MILLS
AND
W. H. LAWSON,
INVENTORS.
BY Robert W. Randle
ATTORNEY.

UNITED STATES PATENT OFFICE.

JOSEPH H. MILLS AND WALTER H. LAWSON, OF RICHMOND, INDIANA, ASSIGNORS TO RICHMOND CASKET COMPANY, OF RICHMOND, INDIANA, A CORPORATION.

CASKET.

No. 807,955.  Specification of Letters Patent.  Patented Dec. 19, 1905.

Application filed October 11, 1905. Serial No. 282,239.

*To all whom it may concern:*

Be it known that we, JOSEPH H. MILLS and WALTER H. LAWSON, citizens of the United States, and residents of the city of Richmond, in the county of Wayne and State of Indiana, have invented new and useful Improvements in Caskets; and we declare that the following is a full, clear, and exact description of the invention, such as will enable others skilled in the art to which it appertains to make and operate the same when taken in connection with the accompanying drawings, forming a part thereof.

Our invention has for its object the provision of a casket having a vertically-movable outer case and having a relatively stationary base portion with upwardly-extending sides and ends for said base for the purposes of ornamentation and to prevent contact of the corpse or the clothing thereof with the outer shell or case and the provision of counterbalancing means for the case.

Other objects and particular advantages will appear in the course of the ensuing specification and will be pointed out in the claims.

Our invention is fully illustrated in the accompanying two sheets of drawings, in which—

Figure 5:
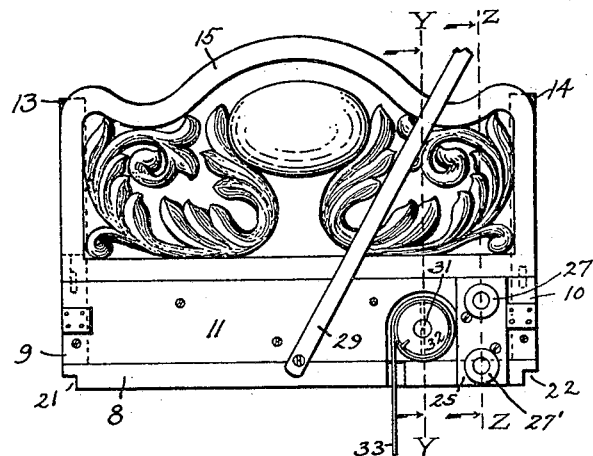
Figure 6:
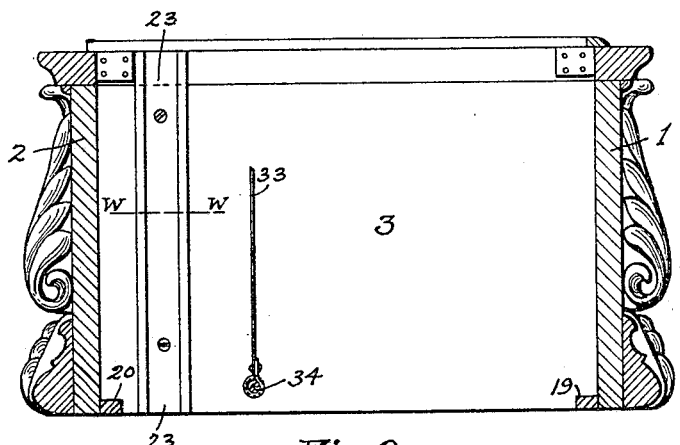
Figures 7, 8:
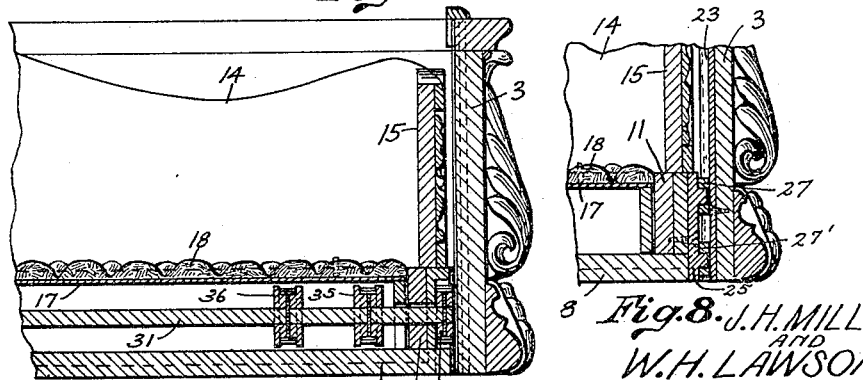

Figure 1 is a top plan view of our casket open, the top standing at right angles to the body thereof, the outer case being lowered. Fig. 2 is a cross-section of our casket as taken on the line X X of Fig. 1, the top and outer case being positioned as in Fig. 1. Fig. 3 is also a cross-section of our casket, also taken on the line X X of Fig. 1, the top being closed and the outer case being raised to its normal position in position for carrying. Fig. 4 is a detail sectional view of one of the guideways and a portion of the case as taken on the line W W of Fig. 6. Fig. 5 shows a detail outside elevation of one end of the base or inner portion of the casket. Fig. 6 shows in detail an inside elevation of one end of the outer case and immediately facing the parts shown in Fig. 5. Fig. 7 is a detail sectional view of the parts as taken on the line Y Y of Figs. 1 and 5, and Fig. 8 is a detail sectional view as taken on the line Z Z of Fig. 5.

Similar indices refer to and denote like parts throughout the several views of the drawings.

With the above-designated views in mind we will now take up the detail description of our invention, which we will refer to as briefly and compactly as we may.

Our invention contemplates a burial-casket consisting, essentially, of four distinct elements—namely, an outer case, a hinged lid or top, a base operative within said case, and the mechanical instrumentalities for operating and controlling the various parts with reference to each other.

In the drawings, the numerals 1, 2, 3, and 4 denote the front, back, right-hand end, and left-hand end, respectively, of the case of our casket, and the numeral 5 denotes the top or lid thereof, which parts may bear various ornamentations and figurations and may be made in various shapes or styles in order to meet varying demands. The lid or top is hinged at its rear edge to the top edge of the back 2 by the hinges 6 and 7, substantially as shown.

The numeral 8 denotes the bottom of the vertically-movable base-section, which has permanently secured thereto and rising from its edges the vertically-disposed base-frame of a height to form the mechanism-chamber, which will presently be referred to, and said frame consists of the front member 9, the rear member 10, and the respective right and left hand members 11 and 12. Removably mounted on said base-frame and secured thereto by dowels, as indicated, with their respective upper and lower edges adjoining, is the ornamental corpse-containing frame, composed of the front member 13, the rear member 14, and the right and left end members 15 and 16, respectively. Said members 14, 15, and 16 rise some distance above the base proper, and edges are artistically contoured and their exposed surfaces are appropriately embellished, as desired, with carving or otherwise, and the front member 13 is quite narrow except near its ends, where it rises in proper curvature with its edges continued to connect and harmonize with that of the said end members.

Secured to the lower inner edges of the members 1 and 2 are the respective cleats 19 and 20, as indicated, on which is adapted to rest the bottom 8 of the base, as indicated. Rabbets 21 and 22 are formed in the front and rear lower edges of the base to receive the said cleats 19 and 20 when the casket is closed, whereby the lower surface of the base may be flush with the lower edges of the outer case, as shown in Fig. 3.

Secured vertically across the faces of the ends 3 and 4 of the case and located near the rear ends are the channel-guideways 23 and 24, respectively, and opposite thereto on the members 11 and 12 of the base-frame are secured the respective plates 25 and its consort located at the opposite end, (not shown,) on which are pivotally mounted the vertically-located rollers 27 and 27' on the right, the consorts identical therewith (not shown) being located on the left.

By the construction just described it will be seen that the base or inner section will be practically frictionlessly guided if it be moved up and down in the case from one to the other of the positions shown in Figs. 2 and 3.

The numerals 29 and 30 denote the two respective right and left actuating-arms, which are pivoted at one end to the ends of the base, and their other ends are pivoted to the outside of the lid 5, the points at which said arms are pivoted being accurately predetermined according to conditions as to weight, shape, &c., of the parts, but they are located substantially as is indicated in the drawings.

From the above it will be seen that if the casket be located on a stand or the like, (indicated by the letter A,) whereby the stand engages only the bottom 8 of the base, as in Fig. 3, and that if the lid 5 be lifted up the base portions will remain stationary on the stand, but the case will drop down around the stand, as shown in Fig. 2, thus locating the bed-board 17 substantially on a level with the upper edge of the case.

The mechanism by which the parts are counterbalanced and are caused to move freely and without appreciable effort may be described as follows: Extending longitudinally of the casket through said mechanism-chamber formed between the bottom 8 and the bed-board 17 and located slightly forward of the guideways 23 and 24 is the shaft 31. Said shaft is mounted revolubly in suitable bearings therefor in the end members 11 and 12 of the case with its ends projecting therethrough to receive the pulley-wheels 32 on the right and its consort (not shown) on the left. In the following-described mechanism the parts are usually in pairs, one member being located on the right and its equivalent identical therewith located on the left. Therefore we will refer only to the parts on the right by numerals, and the parts on the left when they appear will be indicated by the same numerals primed. The numeral 33 denotes a ribbon, preferably of metal, one end being secured to the face of the pulley 32, around which it is adapted to wind, and the opposite end of said ribbon is pivoted by the pintle 34 to the inner face of the lower portion of the member 3 of the case, all substantially as shown in Figs. 5 and 6, being the same at opposite end. Spaced slightly apart and secured on the shaft 31 near the member 15 are the two spool-pulleys 35 and 36, each having wound on its face and secured at its inner end thereto the respective ribbons 37 and 38, which are preferably formed of metal, and secured to the outer ends of the ribbons 37 and 38 are the respective cords 39 and 40, which extend forward and are then diverted inward longitudinally at right angles by their respective pulleys 41 and 42, through which they operate. Said pulleys are secured to the inside of the base, as shown. The numerals 43 and 44 denote the two helical springs secured toward the left of bottom 8 by the permanent staples or the like 47 and 48, respectively.

By the above-described construction we provide two pairs of counterbalances, one pair operating on the right and the other pair on the left of the casket, the combined resiliency of the springs being such as to counterbalance the weight of the outer case and the lid of the casket, this mechanism being shown most clearly in Fig. 1.

From the above it will be noticed that as the lid is being raised the outer case moving down will draw on the ribbons 33, thus revolving the pulley-wheels 32, and they in turn the shaft 31, and as the latter revolves it will wind the ribbons 35, 36, 35', and 36' on their respective spools, thus tensioning the respective springs 43, 44, 43', and 44' and positioning the various parts as shown in Fig. 2, and when it is desired to close the casket a very light pressure down on the lid will close it, holding it at any point, and bring the outer case and the various parts to the positions shown in Fig. 3.

From the foregoing specification, taken in connection with the accompanying drawings, the construction and operation of our invention will be readily apparent without requiring further extenuated description, for the casket is exceedingly simple both as to its construction and operation.

While we have illustrated and described the best means now known to us for carrying out our invention in a practical manner, we desire to have it fully understood that we do not limit ourselves to the exact details of construction shown and described, but hold that changes or variations therein may be made to meet varying conditions.

Having now fully shown and described our invention and its intended operation, what we claim, and desire to secure by Letters Patent of the United States of America, is—

1. In combination with a casket having an outer case, a lid hinged to the case, and an inner base-section over which the case may operate vertically, of the vertical guideways secured to the inner faces of the ends of the case, and the guides secured to the outer faces of the ends of the base-section, a shaft extending longitudinally through the base-section, a pair of spools carried by each end portion of the case, ribbons adapted to be wound on said spools, a coil-spring connected to the outer end of each ribbon by a cord, and the pulleys mounted on the ends of said shaft carrying each a ribbon having their outer ends mounted to the inner face of the ends of the case, all substantially as shown and described and for the purposes set forth.

2. A burial-casket having in combination an outer movable case, a lid hinged to the case, a relatively stationary base contained in said case, means for supporting the base by cleats secured to the case, arms connecting the lid and the base, a bed-board located above the bottom of the base and forming a chamber therebelow, a bed located on the bed-board, a removable frame disposed around and extending above the bed, a shaft extending longitudinally through said chamber, two pairs of helical springs secured at one end to the base within said chamber with their other ends secured to cords, which latter are adapted to be wound on spools secured on said shaft, a pulley secured on each end of the shaft outside said chamber, and ribbons secured to the outside case and to said pulleys and adapted to be wound thereon, all substantially as shown and described.

3. A casket having an outer case, a lid hinged to the case, an inner base-section over which the case operates vertically, vertically-disposed guideways secured to the inner faces of the ends of the case and guides secured to the outer faces of the ends of the base-section, a shaft extending longitudinally through the base-section, spools carried by each end portion of the case, ribbons adapted to wind on said spools, a spring connected to the outer end of each ribbon by a cord or the like, a pulley mounted on each end of said shaft, ribbons adapted to wind on said spools and having their outer ends mounted to the inner face of the ends of the case, all substantially as shown and described and for the purposes set forth.

4. A casket having an outer case, a lid hinged to the rear edge of the case, a base-section located in the outer case, a shaft extending longitudinally from end to end of and through the base, counterbalancing-springs secured within the base, pulleys secured on the shaft, cords adapted to wind on said pulleys with their other ends attached to the free ends of said springs, a spool carried by each end of the shaft at points outside the base and inside the case, ribbons adapted to wind on each spool with their opposite ends attached near the lower edge of the case, and means for revolving said shaft by opening and closing the lid to move the case vertically, all substantially as shown and described.

In testimony whereof we have hereunto signed our names to this specification in the presence of two subscribing witnesses.

JOSEPH H. MILLS.
WALTER H. LAWSON.

Witnesses:
  ORA T. WARD,
  ROBT. W. RANDLE.